(12) United States Patent
An

(10) Patent No.: US 6,529,222 B1
(45) Date of Patent: Mar. 4, 2003

(54) OPTICAL SCANNING SYSTEM FOR PRINTER AND METHOD FOR ADJUSTING STARTING POINT OF IMAGE SCANNING

(75) Inventor: Seung-deog An, Yongin (KR)

(73) Assignee: Samsung Electronics Co. Ltd., Kyungki-do (KR)

(*) Notice: Subject to any disclaimer, the term of this patent is extended or adjusted under 35 U.S.C. 154(b) by 0 days.

(21) Appl. No.: 09/431,258

(22) Filed: Nov. 1, 1999

(30) Foreign Application Priority Data

Oct. 31, 1998  (KR) ............................. 98-46558

(51) Int. Cl.⁷ .................. B41J 2/385; G03G 15/00; G03G 13/04
(52) U.S. Cl. ........................ 347/133; 399/160
(58) Field of Search ................. 347/133, 132, 347/246, 116; 399/301, 160

(56) References Cited

U.S. PATENT DOCUMENTS

| | | | |
|---|---|---|---|
| 5,381,165 A | 1/1995 | Lofthus et al. | |
| 5,381,167 A | 1/1995 | Fujii et al. | |
| 5,596,444 A | 1/1997 | Eguchi | |
| 5,966,572 A | * 10/1999 | Mishra et al. | 399/160 |
| 6,144,393 A | * 11/2000 | Kwak | 347/116 |
| 6,198,490 B1 | * 3/2001 | Eom et al. | 347/116 |

* cited by examiner

*Primary Examiner*—Susan S. Y. Lee
(74) *Attorney, Agent, or Firm*—Sughrue Mion, PLLC

(57) ABSTRACT

An optical scanning system for a printer. The optical scanning system includes: an optical scanning unit installed to scan light onto a circulating photoreceptor web; a photodetector installed for receiving scanning light emitted from the optical scanning unit; a defective edge area detector for comparing pulse signals output in sequence from the photodetector to determine whether the edge of the photoreceptor web has a defect, and outputting an edge defect signal if a defective area is detected; an estimated pulse width calculator for outputting a predetermined estimated pulse width, and updating the estimated pulse width for the next line image scanning using the signal from the defective edge area detector, the predetermined estimated pulse width, and the pulse signal from the photodetector; a line scanning synchronous signal generator for generating a line scanning synchronous signal in synchronicity with the predetermined estimated pulse width; and an optical scanning unit driver for driving the optical scanning unit such that the optical scanning unit emits image information light onto the photoreceptor web synchronized with the line scanning synchronous signal. By the optical scanning system and a method for adjusting the start point of image scanning, errors in writing an image can be suppressed, which are caused by defects at the edge of the photoreceptor web.

11 Claims, 6 Drawing Sheets

OPTICAL SCANNING SYSTEM FOR PRINTER AND METHOD FOR ADJUSTING STARTING POINT OF IMAGE SCANNING

BACKGROUND OF THE INVENTION

1. Field of the Invention

The present invention relates to an optical scanning system for printers and a method for adjusting the starting point of image scanning, and more particularly, to an optical scanning system for printers, in which a defective area is detected at the edge of a photoreceptor web and a starting point of line image scanning is adjusted according to the detection result.

2. Description of the Related Art

FIG. 1 shows a general electrophotographic color printer. Referring to FIG. 1, a reset unit 15, optical scanning units 30, photodetectors 18, developer units 16, a drying unit 19 and a transfer unit 20 are positioned around a photoreceptor web 14 circulating around a plurality of rollers 11, 12 and 13.

During the printing operation, the optical scanning units 30 scan light onto the photoreceptor web 14 circulating through the reset unit 15 and an electrostatic latent image is formed on the photoreceptor web 14 by the scanned light. The electrostatic latent image is developed by using a developer supplied from the developer units 16. A color image is formed on the photoreceptor web 14 by the optical scanning units 30 which emit lights for each of the respective colors, and by the developer units 16 which develop the electrostatic latent image with the corresponding colors. The color image formed on the photoreceptor web 14 is first transferred by a transfer roller 21 which rotates partially engaged with the photoreceptor web 14, passing through the drying unit 19 with continuous movement of the photoreceptor web 114. In addition, the image transferred onto the transfer roller 21 is again transferred on a paper 23 with the rotation of the transfer roller and a fixing roller 22.

FIG. 2 shows a conventional optical scanning system adopted in the printer shown in FIG. 1. The optical scanning system comprises an optical scanning unit 30, a photodetector 18 and an optical scanning controller 35. The optical scanning unit 30 scanning light onto the photoreceptor web 14 in a main scanning direction, parallel to the width of the photoreceptor web 14. The photoreceptor web 14 moves in a direction indicated by an arrow A. The optical scanning unit 30 comprises a light source 31, a rotary polygonal mirror 32 and a lens unit 33. Here, a direction perpendicular to the movement direction of the photoreceptor web 14, and parallel to the width of the photoreceptor web, is referred to as a main scanning direction. Further, a direction perpendicular to the main scanning direction, and in the movement direction of the photoreceptor web 14 is referred to as a sub-scanning direction.

The photodetector 18 is installed so as to detect the light emitted toward the edge of the photoreceptor web 14 by the optical scanning units 30. The optical scanning controller 35 synchronizes initiation of scanning light corresponding to image information, onto an image writing area D set in the photoreceptor web 14, according to a pulse signal output from the photodetector 18 in response to the reception of light. That is, the optical scanning controller 35 determines an end point of the reception of the pulse signal from the photodetector 18 as the point in time at which the light from the optical scanning units 30 reaches the edge of the photoreceptor web 14. The optical scanning controller 35 controls the optical scanning units 30 such that the emission of light, corresponding to the image information from a light source 31 starts after a predetermined delay time from the end point of the reception of the pulse signal. This delay time allows the scan light from the optical scanning unit 30 to be properly concentrated inside the writing area D of the photoreceptor web 14.

However, because the light source 31 emits light corresponding to the image information after a predetermined delay time, the scanning of image information may deviate from the writing area D when the edge of the photoreceptor web 14 has a defect at its edge, thereby causing error in writing of the image.

SUMMARY OF THE INVENTION

To solve the above problems, it is an object of the present invention to provide an optical scanning system for a printer, capable of suppressing errors in writing images by compensating for a defective area of an edge of a photoreceptor web through adjustment of a line scanning starting point, and a method for adjusting the starting point of line scanning onto the photoreceptor web.

According to an aspect of the present invention, there is an optical scanning system for a printer, comprising: an optical scanning unit for scanning light onto a circulating photoreceptor web; a photodetector for receiving scanning light emitted from the optical scanning unit over the edge of the photoreceptor web and outputting pulse signals corresponding to the detected light; a defective edge area detector for comparing the photodetector pulse signals in sequence to determine whether the edge of the photoreceptor web has a defect, and outputting an edge defect signal if a defective area is detected; an estimated pulse width calculator for outputting a predetermined estimated pulse width, and updating the estimated pulse width for the next line image scanning, wherein the estimated pulse width is calculated from the signal from the defective edge area detector, the predetermined estimated pulse width, and the pulse signal from the photodetector; a line scanning synchronous signal generator for generating a line scanning synchronous signal in synchronicity with the predetermined estimated pulse width; and an optical scanning unit driver for driving the optical scanning unit such that the optical scanning unit emits the light onto image information synchronized with the line scanning synchronous signal.

Preferably, the optical scanning system further comprises a belt weaving speed calculator for calculating the moving rate of the edge of the photoreceptor web in a light scanning direction. The moving rate is calculated from the pulse signal of the photodetector or information about the estimated pulse width from the estimated pulse width calculator until the edge defect signal is received. The belt weaving speed calculator also calculates a correction value to correct the estimated pulse width, from the calculated moving rate. The estimated pulse width calculator adds the correction value to the predetermined estimated pulse width, and updates the next estimated pulse width with the addition result when the edge defect signal is received.

According to another aspect of the present invention, there is provided a method of adjusting a starting point of image scanning in an optical scanning system for a printer, the optical scanning system comprising an optical scanning unit installed to scan light onto a circulating photoreceptor web, and a photodetector capable of receiving scanning light emitted from the optical scanning unit that shines over the edge of the photoreceptor web, the method comprising the steps of: (a) counting the width of pulses output from the photodetector in response to the reception of light by the photodetector; (b) generating a line scanning synchronous signal for synchronizing initiation of image scanning in the optical scanning unit, the synchronous signal generated after a duration of time equivalent to a predetermined estimated pulse width plus a predetermined reference value, from a point in time when the pulse is generated by the photodetector; (c) determining whether the edge is of the photoreceptor web is a defective area by comparing the difference between the pulse width counted in the step (a) and the pulse width output from the photodetector just before the step (a); (d) if the edge of the photoreceptor web is determined to have a defective area in the step (c), adjusting the predetermined estimated pulse width and updating the next estimated pulse width with the adjusted pulse width; and (e) if the edge of the photoreceptor web is determined not to have a defective area in the step (c), comparing the predetermined estimated pulse width and the width of pulse counted in the step (a) to determine the next estimated pulse width.

Preferably, the step (d) calculates the moving rate of the edge of the photoreceptor web in a light scanning direction using the pulse signals from the photodetector or information about the estimated pulse width having been updated in order. A correction value is calculated according to the moving rate, the correction value is then added to the predetermined estimated pulse width, and the next estimated pulse width is updated with the result of addition.

Preferably, step (e) comprises the steps of: (e1) if the width of pulses counted in the step (a) is smaller than the predetermined estimated pulse width, the next estimated pulse width is updated with a value obtained by subtracting a predetermined reference value from the predetermined estimated pulse width; (e2) if the width of pulses counted in the step (a) is greater than the predetermined estimated pulse width, the next estimated pulse width is updated with a value obtained by adding a predetermined reference value to the predetermined estimated pulse width; and (e3) if the width of pulse counted in the step (a) is equal to the predetermined estimated pulse width, the next estimated pulse width is updated with the predetermined estimated pulse alone.

BRIEF DESCRIPTION OF THE DRAWINGS

The above object and advantages of the present invention will become more apparent by describing the preferred embodiments in detail with reference to the attached drawings in which.

DESCRIPTION OF THE PREFERRED EMBODIMENTS

Figure 1:
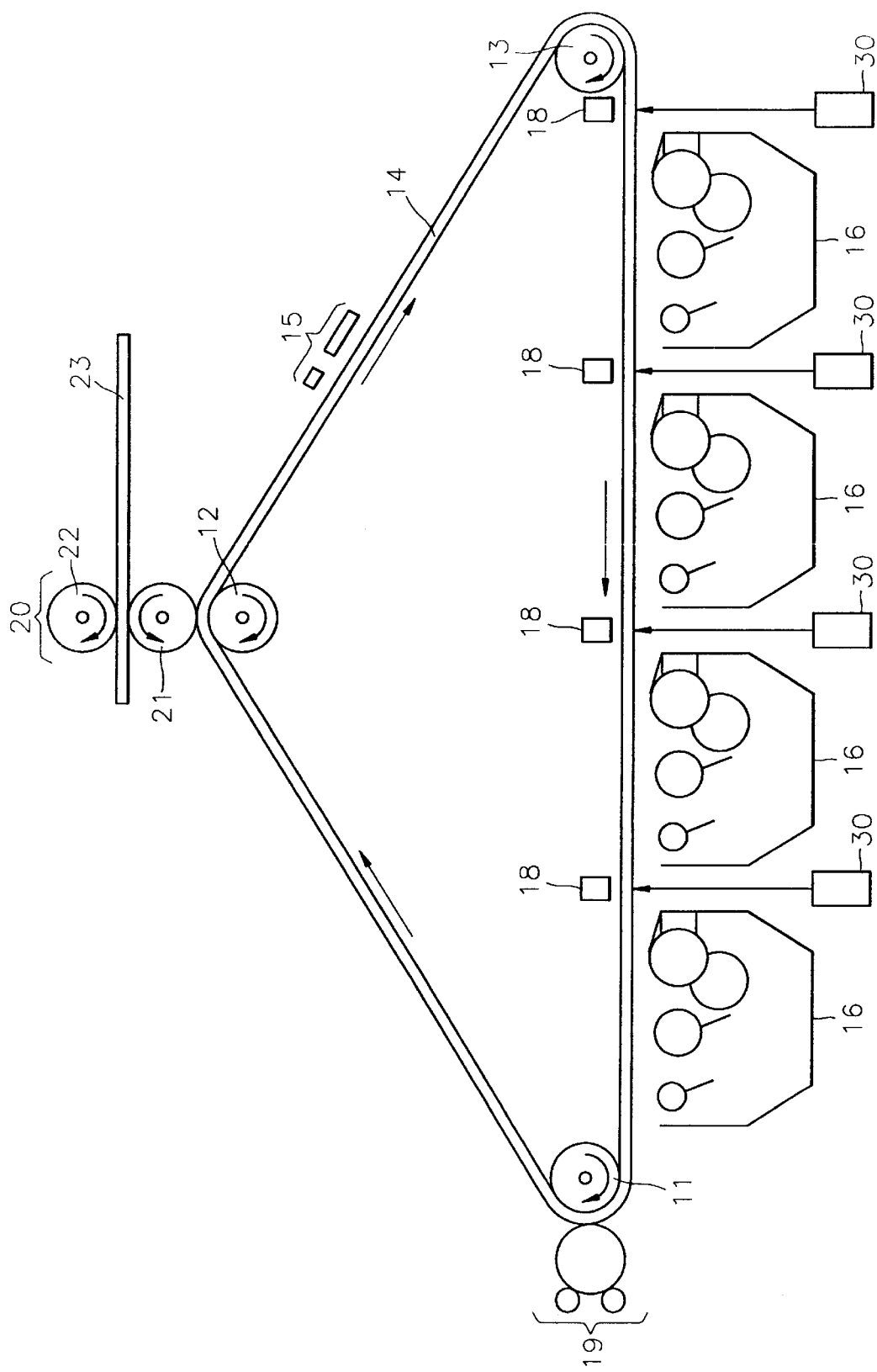
FIG. 1 shows a general color printer.
Figure 2:
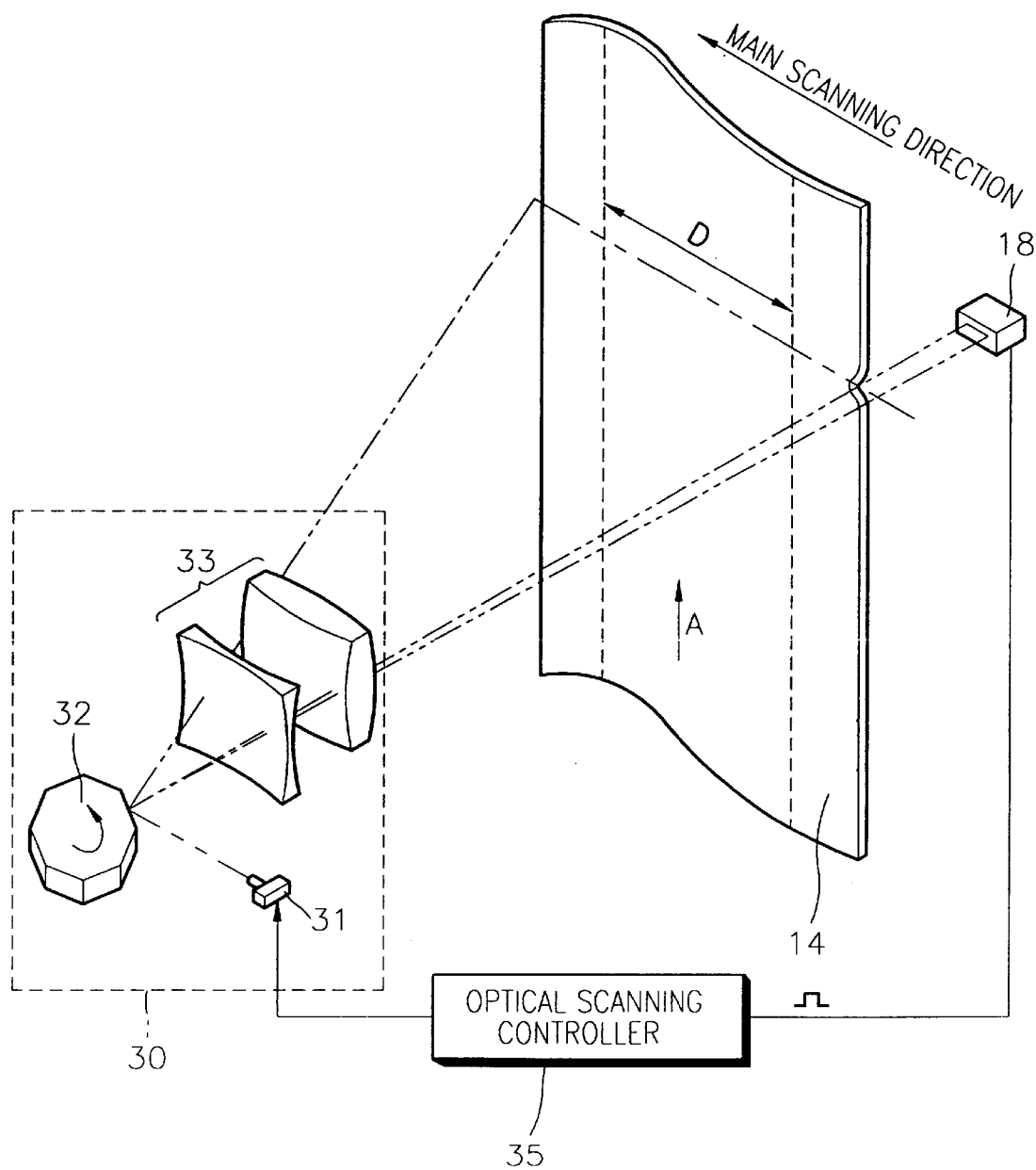
FIG. 2 shows a conventional optical scanning system of the color printer, illustrating a conventional method for initiating image scanning.
Figure 3:
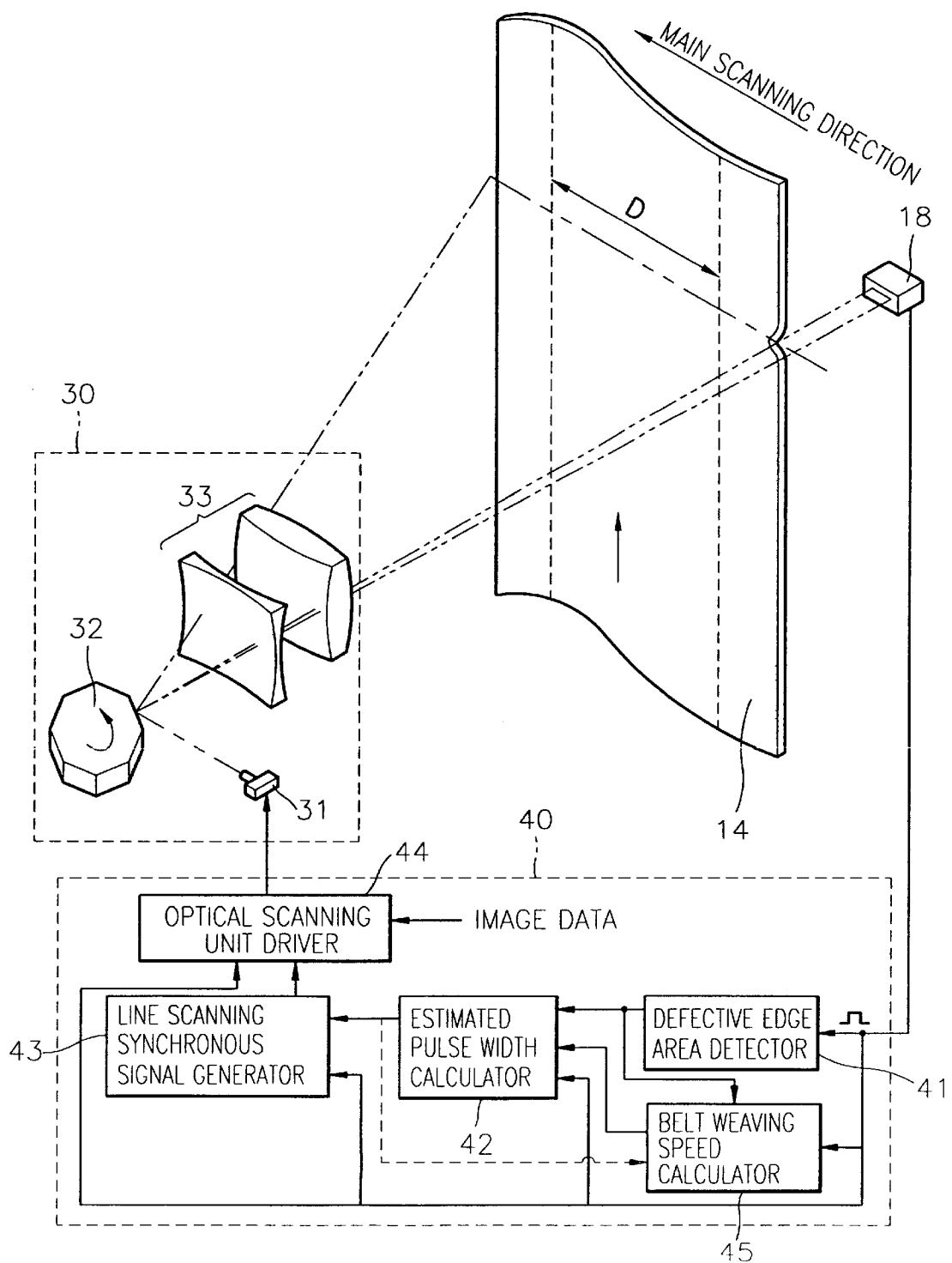
FIG. 3 shows an optical scanning system of a printer according to a preferred embodiment of the present invention.

In FIG. 3, the elements performing the same functions as those of FIGS. 1 and 2 are represented by the same reference numerals. An optical scanning system of FIG. 3 comprises an optical scanning unit 30, a photodetector 18 and an optical scanning controller 40.

The photodetector 18 is positioned at a predetermined position off the edge of the photoreceptor belt 14. The photodetector 18 receives light from the optical scanning unit 30 until the light from the optical scanning unit 30 is blocked by the photoreceptor web 14. The photodetector 18 outputs a pulse signal corresponding to the amount of light received. An optical scanning control unit 40 comprises a defective edge area detector 41, an estimated pulse width calculator 42, a line scanning synchronous signal generator 43, an optical scanning unit driver 44 and a belt weaving speed calculator 45. The optical scanning control unit 40 controls the driving of the optical scanning unit 30 according to an output signal from the photodetector 18 such that the light corresponding to image information is emitted onto the writing area D of the photoreceptor web 14.

The defective edge area detector 41 calculates a change in the width between a current pulse signal output provided in response to the reception of light by the photodetector 18 and the width of a pulse signal output from the photodetector 18 just prior to the current pulse signal, and makes a determination as to whether the edge of the photoreceptor web 14 has a defective area, from the change in the width of the pulse signal. If a defective area is present in the edge of the photoreceptor web 14, the defective edge area detector 41 outputs an edge defect signal. The defective edge area detector 41 comprises a counter (not shown) for counting the input pulses, a clock generator (not shown) for generating clock signals for the counter, a memory (not shown) for storing the count value and an operating algorithm for use in determining a defective edge area.

Figure 4A:
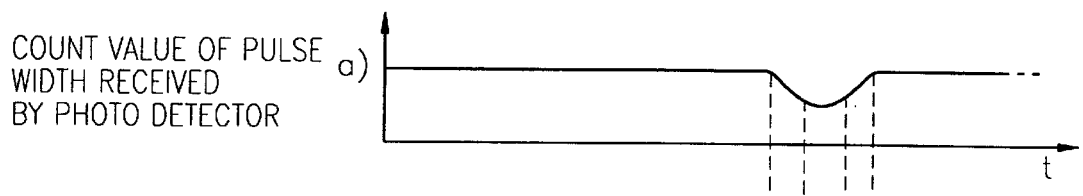
FIGS. 4A through 4D are timing diagrams illustrating detection of edge areas by the defective edge area detector shown in FIG. 3.
Figure 4B:
Figure 4C:
Figure 4D:
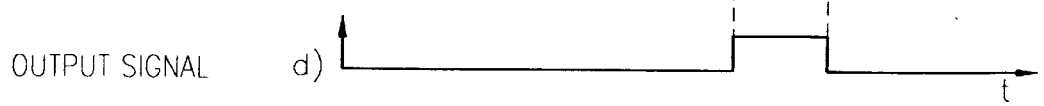

An example of edge detection by the defective edge area detector 41 will now be described with reference to FIGS. 4A through 4D. FIG. 4A shows the count value of a pulse width provided by the photodetector 18 when the optical scanning unit 30 emits light through a defective portion of the photoreceptor web 14. The defective area of photoreceptor web 14 protrudes at an arbitrary length and appears as a curved portion of the mapping graph obtained from the count value of the pulse width provided by photodetector 18. Changes in the pulse width between the current count and the preceding count, that is, the difference between the current count value and the count value obtained in the preceding count, can be calculated for every line scanning from the data of FIG. 4A, resulting in the graph shown in FIG. 4B. Also, how much the value illustrated in FIG. 4B diverges from a predetermined allowable width range $\Delta V_{ref}$, which is set in consideration of the movable range of the photoreceptor web 14 in a direction perpendicular to the traveling direction thereof while the photoreceptor web 14 travels, is determined and the result is shown in FIG. 4C. The allowable width range $\Delta V_{ref}$ is determined according to the degree of adjustment of a belt steering device, which can be made on the traveling direction of the photoreceptor web 14, such that the photoreceptor web 14 returns to its original track. FIG. 4C is obtained from FIG. 4B in consideration of a lower limit $-\Delta V_{ref}$ and an upper limit $+\Delta V_{ref}$ of the allowable width range $\Delta V_{ref}$.

The defective edge area detector 41 determines the point where the difference between the adjacent pulse widths goes below the lower limit $-\Delta V_{ref}$ to be a starting point of the recessed defective area. Then, continuously input pulse widths are compared. During the comparison, a point where the change in pulse width returns to within the allowable range after going beyond the upper limit of the allowable range is determined to be an end point of the defective area. For the duration, from the point when the change in the pulse width goes below the lower limit $-\Delta V_{ref}$ until the change returns into the allowable range after going over the upper limit $+\Delta V_{ref}$, an edge defect signal which is indicative of the defective area is output. Conversely, when the light from the optical scanning units 31 scans a recessed defective area of the photoreceptor web 14, the change in the pulse width first exceeds the upper limit $+\Delta V_{ref}$, thus this point is determined to be a start point of the recessed defective area. In this case, an edge defect signal is output for the duration when the change in the pulse width starts exceeding the upper limit $+\Delta V_{ref}$ until the change returns into the allowable range after going below the lower limit $-\Delta V_{ref}$.

The estimated pulse width calculator 42 outputs an estimated pulse width set with respect to the current scanning line and calculates an estimated pulse width for the next image scanning line using the information from the defective edge area detector 41, the pulse width from the photodetector 18, and the predetermined estimated pulse width, which is set with respect to the current scanning line. The estimated pulse width calculator 42 updates the next estimated pulse width while the edge defect signal is not received, using the comparison result between the width of pulse signals output from the photodetector 18 in response to the reception, and the predetermined estimated pulse width, by the following method. In addition, the estimated pulse width calculator 42 sets the updated estimated pulse width for use in next line scanning.

In the estimation of the pulse width for the next line scanning, the pulse width from the photodetector 18 is compared to the estimated pulse width, which is set with respect to the current scanning line. If the pulse width from the photodetector 18 is smaller than the predetermined estimated pulse width, a predetermined reference value is subtracted from the estimated pulse width and then the result is set to the next estimated pulse width. If the pulse width from the photodetector 18 is greater than the estimated pulse width, the predetermined reference value is added to the estimated pulse width, and then the result is set to the next estimated pulse width. If the pulse width from the photodetector 18 is equal to the estimated pulse width, the estimated pulse width remains as the estimated width for the next pulse. Here, the estimated pulse width and the predetermined reference value can be expressed as the number of clocks having a predetermined frequency.

On the other hand, while the edge defect signal is received, the estimated pulse width calculator 42 may set the estimated pulse width set immediately before the input of the edge defect signal, to the next estimated pulse width until the input of the edge defect signal is terminated. Alternatively, while the edge defect signal is received, the estimated pulse width calculator 42 sets the sum of the predetermined estimated pulse width and a correction value calculated by the belt weaving speed calculator 45, to the next estimated pulse width.

The belt weaving speed calculator 45 analyzes the pulse signal from the photodetector 18 or the estimated pulse width from the estimated pulse width calculator 42 with respect to a non-defective area of the photoreceptor web 14 several times, to calculate the current moving rate of the edge of the photoreceptor web 14 in the main scanning direction and to calculate a correction value which is used to correct the estimated pulse width according to the current moving rate. The belt weaving speed calculator 45 calculates the moving speed of the edge in a direction perpendicular to the traveling direction of the photoreceptor web 14, using the stored changes in the pulse widths with respect to the preceding sequential scanning lines, based on the pulse signal input from the photodetector 18 last input before the edge defect signal is output. For example, assuming that the number of clock signals corresponding to the width of the last pulse input immediately before the edge defect signal is received, is 250 and the number of clocks corresponding to each preceding pulse width is 249, 248, 247 and 246 in reverse pulse input order, this means that the edge of the photoreceptor web 14 moves by a width corresponding to 1 clock signal for 1 cycle of line scanning. Here, the number of clock signals, which is 1 in this case, is set to a correction value. Alternatively, the belt weaving speed calculator 45 may calculate a correction value from the estimated pulse widths, which are received while the edge defect signal is not generated.

The line scanning synchronous signal generator 43 generates a line scanning synchronous signal, which is indicative of a starting point of the line scanning onto the image information, which is synchronized after a duration of time equivalent to the estimated pulse width plus the predetermined reference value, from the point of outputting a pulse signal by the photodetector 18. The estimated pulse width is output from the estimated pulse width calculator 42 whenever a pulse signal is generated from the photodetector 18. The optical scanning unit driver 44 drives the optical scanning unit 30 such that the light corresponding to the image information is emitted in synchronicity with the line scanning synchronous signal. Here, once the pulse signal from the photodetector 18 is received, the optical scanning unit driver 44 stops emission of light from the optical scanning units 30 until the line scanning synchronous signal is received.

Figure 5:
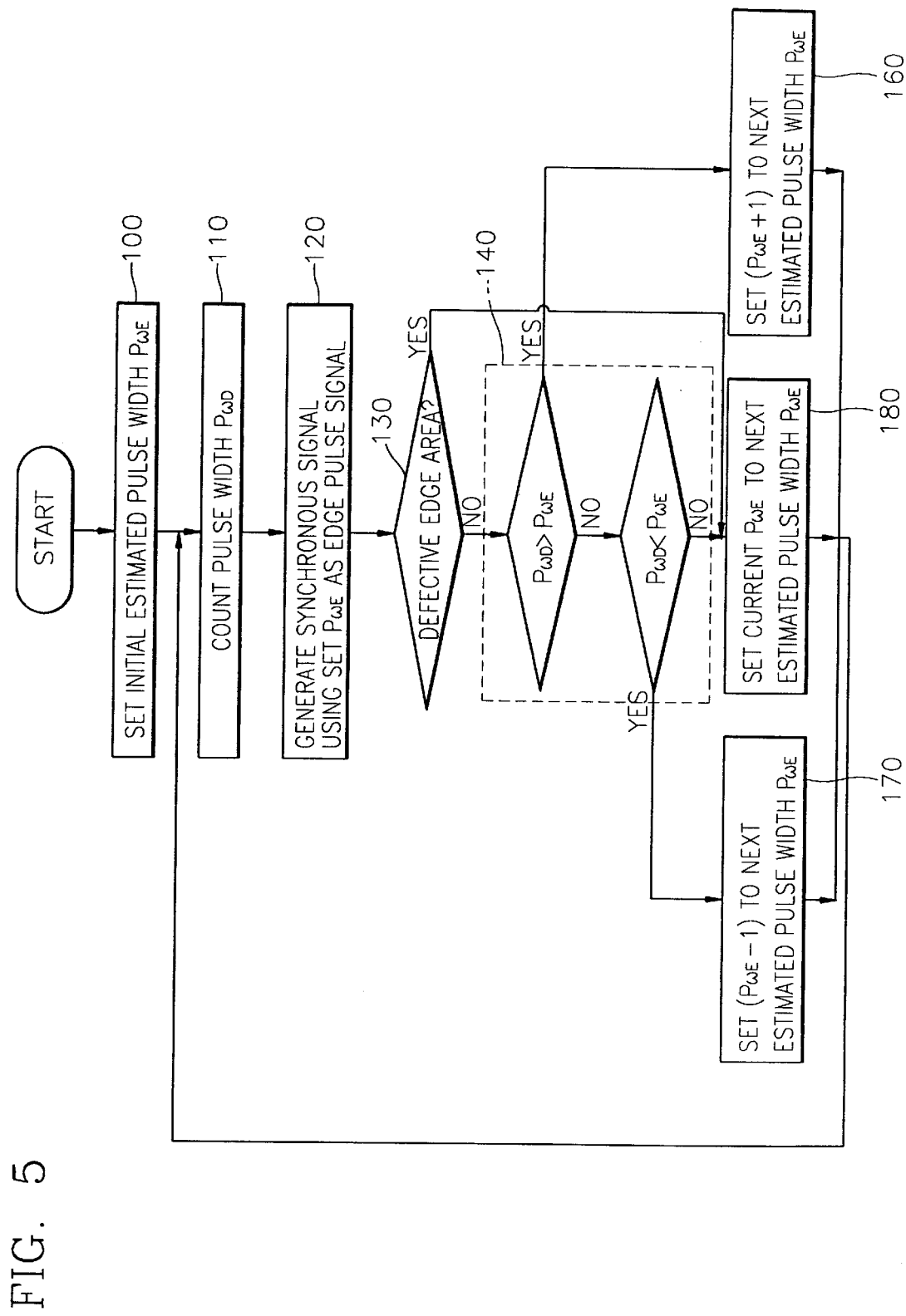
FIG. 5 is a flowchart illustrating a method for adjusting a starting point of line image scanning according to a preferred embodiment of the present invention.

In a method for adjusting the starting point of scanning in an optical scanning system according to a preferred embodiment of the present invention, illustrated in FIG. 5, as an initialization step, an initial estimated pulse width $P_{WE}$ is set (step 100). The initial estimated pulse width is used as an initial value when power is applied to a printing apparatus. Preferably, the initial estimated pulse width $P_{WE}$ is set to the pulse width which is output from the photodetector 18, in response to the reception of scanning light emitted from the optical scanning unit 30 until the scanning light reaches the edge of the photoreceptor web 14 which has no defect. Alternatively, the final estimated pulse width set immediately before the power is turned off, can be set to the initial value on supply of power.

After initialization, step 110 counts a pulse width $P_{WD}$, which is output from the photodetector 18 in response to the reception of light, until the scanning light from the optical scanning unit 30 reaches the edge of the photoreceptor web 14. Here, a period of clock generation for counting the pulse width is set to be shorter than the scanning interval between pixels on the photoreceptor web 14, preferably, to be less than one fifth of the scanning interval between the pixels. For example, when the scanning interval between pixels is 50 ns, the period of clock generation is set to 10 ns or less.

The pulse width $P_{WD}$ from the photodetector 18 is stored as the number of count clocks. In this case, it is preferable that the estimated pulse width $P_{WE}$ is stored as the number of clock signals. When counting the pulse width $P_{WD}$ from the photodetector 18 is completed in the step 110, the emission of light is temporarily stopped until the subsequent line scanning synchronous signal is generated. In step 120, after a predetermined delay from a point in time when the pulse signal is input from the photodetector 18 by the sum of the duration corresponding to the estimated pulse width $P_{WE}$ set and a predetermined time T, a line scanning synchronous signal is generated. The predetermined time T equals to the duration from a point in time when the light reaches the edge of the photoreceptor web until the light scans the leading end of a writing area D set in the photoreceptor web 14. When the line scanning synchronous signal is generated, line scanning onto the image information is started. Then, the pulse width $P_{WD}$ counted in the step 110 is compared to a pulse width with respect to the preceding line, which is output from the photodetector 18, to determine whether the current scanning area is a defective edge area, by the above described method (step 130). If the current scanning area is determined to be the defective edge area in the step 130, the predetermined current estimated pulse width $P_{WE}$ remains as the next estimated pulse width $P_{WE}$. If the current scanning area is determined not to be the defective edge area in the step 130, the pulse width $P_{WD}$ obtained in the step 110 is compared to the predetermined estimated pulse width $P_{WE}$ (step 140).

If the pulse width $P_{WD}$ obtained in the step 110 is greater than the estimated pulse width $P_{WE}$, the sum of the number of clock signals corresponding to the estimated pulse width $P_{WE}$ used in the step 120 and a predetermined reference value, for example, 1 as the number of clock signals, is added to the number of clock cycles corresponding to the estimated pulse width $P_{WE}$ of the step 120, and the addition result is set to the next estimated pulse width $P_{WE}$ (step 160). If the pulse width $P_{WD}$ obtained in the step 110 is smaller than the estimated pulse width $P_{WE}$ used in the step 120, a predetermined reference value, for example, 1 as the number of clock signals, is subtracted from the number of clock signals corresponding to the estimated pulse width $P_{WE}$ of the step 120, and the subtraction result is set to the next estimated pulse width $P_{WE}$ (step 170). If the pulse width $P_{WD}$ from the step 110 is equal to the estimated pulse width $P_{WE}$ of the step 120, the number of clock signals corresponding to the estimated pulse width $P_{WE}$ is set to the next estimated pulse width $P_{WE}$ (step 180). The next estimated pulse width $P_{WE}$ set in either the step 160, 170 or 180, is used in determining the point in time when a line scanning synchronous signal for the next line scanning is generated. These steps are repeated every line scanning of the optical scanning unit 30.

In updating the estimated pulse width $P_{WE}$ through the above steps, the estimated pulse width $P_{WE}$ is corrected to be equal to the pulse width $P_{WD}$ from the photodetector 18. In particular, the pulse width output from the photodetector 18 is not used as a decisive factor for the next estimated pulse width $P_{WE}$ in a defective area, and thus scanning of image information can be properly started at the leading end of the writing area (D), regardless of defects in the edge of the photoreceptor web 14.

Figure 6:
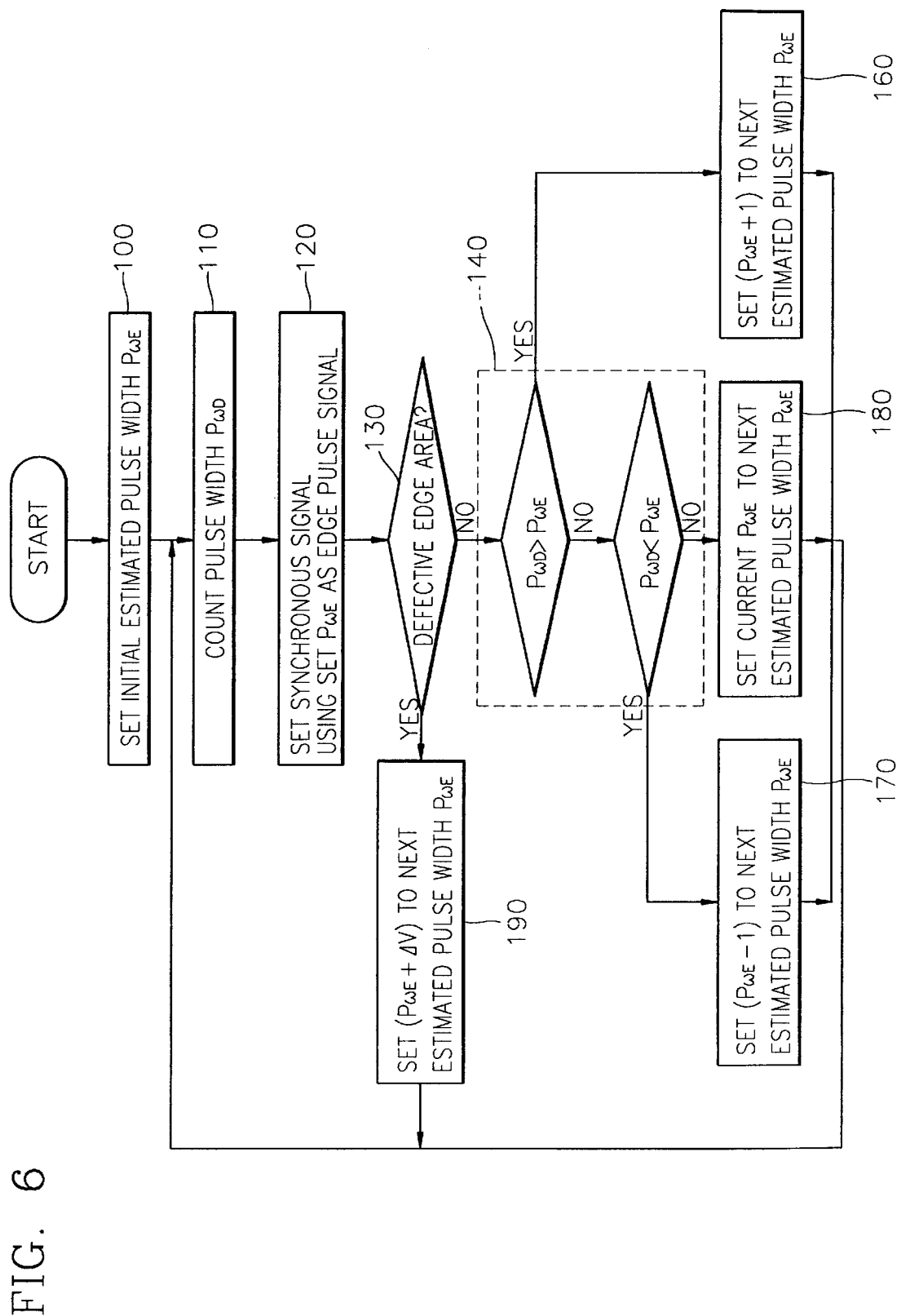
FIG. 6 is a flowchart illustrating a method for adjusting a starting point of line image scanning according to another preferred embodiment of the present invention.

Another method of determining the next estimated pulse width $P_{WE}$ in the defective edge area is illustrated in FIG. 6. The same steps as in FIG. 5 are represented by the same reference numerals, and an explanation thereof is not provided.

Referring to FIG. 6, when the current scanning area is determined to be a defective edge area in the step 130, a correction value ΔV, which is to be used for adjusting the estimated pulse width $P_{WE}$ and is calculated using the current moving rate of the edge of the photoreceptor web 14 in the main scanning direction in the above-mentioned belt weaving speed calculator 45 (see FIG. 3), is added to the estimated pulse width $P_{WE}$ of the step 120. The result, ($P_{WE}$+ΔV), is set to the next estimated pulse width $P_{WE}$ (step 190). By doing so, the minute movement of the photoreceptor web 14 in a direction perpendicular to the traveling direction thereof can be reflected, leading to a more accurate correction of the scanning initiation point.

As described above, in the optical scanning system for a printer and the method for adjusting the start point of image scanning according to the present invention, errors in writing an image can be suppressed, which are caused by defects at the edge of the photoreceptor web.

What is claimed is:

1. An optical scanning system for a printer comprising:
    an optical scanner for scanning light onto a circulating photoreceptor web;
    a photodetector for receiving scanning light emitted from said optical scanner off an edge of the photoreceptor web, said photodetector outputting pulse signals corresponding to the light received;
    a defective edge area detector for comparing said pulse signals in sequence to determine whether the edge of the photoreceptor web has a defect, said defective edge area detector outputting an edge defect signal if a defective area is detected at the edge of the photoreceptor web;
    an estimated pulse width calculator for outputting a predetermined estimated pulse width, and updating an estimated pulse width for a next line image scanning, said predetermined estimated pulse width, and said pulse signals from the photodetector;
    a line scanning synchronous signal generator for generating a line scanning synchronous signal in synchronism with said predetermined estimated pulse width; and
    an optical scanner driver for driving the optical scanner such that the optical scanner emits light onto said photoreceptor web, said optical scanner driver being synchronized with the line scanning synchronous signal.

2. The optical scanning system of claim 1, wherein the estimated pulse width calculator includes a comparator that compares the predetermined estimated pulse width to a current pulse width from the photodetector while the edge defect signal is not received, and if the current pulse width from the photodetector is smaller than the predetermined estimated pulse width, the comparator updates the next estimated pulse width with the result obtained by subtracting a predetermined reference value from the predetermined estimated pulse width, and if the current pulse width from the photodetector is greater than the predetermined estimated pulse width, the comparator updates the next estimated pulse width with the result obtained by adding the predetermined reference value to the predetermined estimated pulse width, and if the current pulse width from the photodetector is equal to the predetermined estimated pulse width, the comparator updates the next estimated pulse width with the predetermined estimated pulse width alone; and if the edge defect signal is input, the comparator updates the next estimated pulse width with the predetermined estimated pulse width.

3. The optical scanning system of claim 1, further comprising a belt weaving speed calculator for calculating the moving rate of the edge of the photoreceptor web in a light scanning direction, wherein the moving rate is calculated from at least one of, the pulse signals of the photodetector and the estimated pulse width, said moving rate calculated until the edge defect signal is received, said belt weaving speed calculator also calculating a correction value for correcting the estimated pulse width from the calculated moving rate, wherein the estimated pulse width calculator adds the correction value to the predetermined estimated pulse width, and updates the next estimated pulse width with the addition result while the edge defect signal is received.

4. The optical scanning system of claim 3, wherein the estimated pulse width calculator includes a comparator that compares the predetermined estimated pulse width to a current pulse width from the photodetector while the edge defect signal is not received, and if the current pulse width from the photodetector is smaller than the predetermined estimated pulse width, comparator updates the next estimated pulse width with the result obtained by subtracting a predetermined reference value from the predetermined estimated pulse width, and if the current pulse width from the photodetector is greater than the predetermined estimated pulse width, the comparator updates the next estimated pulse width with the result obtained by adding the predetermined reference value to the predetermined estimated pulse width, and if the current pulse width from the photodetector is equal to the predetermined estimated pulse width, the comparator updates the next estimated pulse width with the predetermined estimated pulse width as it is.

5. A method of adjusting a starting point of image scanning in an optical scanning system for a printer, the optical scanning system comprising an optical scanner for scanning light onto a circulating photoreceptor web, and a photodetector for receiving scanning light emitted from the optical scanner off an edge of the photoreceptor web, said photodetector outputting pulses corresponding to the light received, the method comprising the steps of:

(a) determining a width of pulses output from the photodetector;

(b) generating a line scanning synchronous signal for synchronizing initiation of image scanning, the line scanning synchronous signal generated after a duration of time equivalent to a predetermined estimated pulse width plus a predetermined reference value, from a point in time when a pulse is generated from the photodetector;

(c) determining whether an area of the edge of the photoreceptor web is defective, from a difference between the width of pulses determined in the step (a);

(d) if the edge of the photoreceptor web is determined to have a defective area in the step (c), updating a next estimated pulse width with the predetermined estimated pulse width; and (e) if the edge of the photoreceptor web is determined not to have a defective area in the step (c), comparing the predetermined estimated pulse width and the width of a current pulse determined in the step (a) to determine the next estimated pulse width.

6. The method of claim 5, wherein the step (d) updates the next estimated pulse width with an adjusted predetermined estimated pulse width.

7. The method of claim 6, wherein the predetermined estimated pulse width is adjusted by the steps of:

(a) calculating a rate of edge movement of the photoreceptor web in a light scanning direction;

(b) calculating a correction value according to the rate of edge movement;

(c) adding the correction value to the predetermined estimated pulse width.

8. The method of claim 5, wherein the step (e) comprises the steps of:

(e1) if the width of said current pulse is smaller than the predetermined estimated pulse width, updating the next estimated pulse width with a value obtained by subtracting a predetermined reference value from the predetermined estimated pulse width;

(e2) if the width of said current pulse is greater than the predetermined estimated pulse width, updating the next estimated pulse width with a value obtained by adding a predetermined reference value to the predetermined estimated pulse width; and (e3) if the width of said current pulse is equal to the predetermined estimated pulse width, updating the next estimated pulse width with the predetermined estimated pulse.

9. The method of claim 8, wherein the predetermined reference values used in the steps (e1) and (e2) are equal to each other.

10. The method of claim 9, wherein the reference values are set to be smaller than a scanning interval from the optical scanner between pixels.

11. The method of claim 7, wherein the moving rate is calculated from at least one of, said pulses of said photodetector, and information about the estimated pulse width that has been updated in order.

* * * * *